United States Patent [19]

Eustache

[11] Patent Number: 5,203,602
[45] Date of Patent: Apr. 20, 1993

[54] BASE UNIT FOR A WINDSHIELD WIPER ASSEMBLY

[75] Inventor: Jean-Pierre Eustache, Antony, France

[73] Assignee: Valeo Systemes D'Essuyage, Montigny-Le-Bretonneux, France

[21] Appl. No.: 821,427

[22] Filed: Jan. 15, 1992

[30] Foreign Application Priority Data

Jan. 17, 1991 [FR] France ............... 91 00500

[51] Int. Cl.⁵ .............................. B60S 1/26
[52] U.S. Cl. ................. 296/96.15; 15/250.1; 296/192
[58] Field of Search ............ 296/96.15, 96.17, 192; 15/250.1-250.3; 239/302

[56] References Cited

U.S. PATENT DOCUMENTS

| 3,855,661 | 12/1974 | Prince | 15/250.01 |
| 4,387,853 | 6/1983 | Sarai et al. | 15/250.01 X |
| 4,893,865 | 1/1990 | McClain et al. | 296/192 |

FOREIGN PATENT DOCUMENTS

| 2329118 | 6/1973 | Fed. Rep. of Germany . |
| 3308466 | 3/1983 | Fed. Rep. of Germany . |
| 8812550 | 10/1988 | Fed. Rep. of Germany . |
| 1368673 | 9/1963 | France . |
| 2609437 | 1/1987 | France . |
| 2613303 | 4/1987 | France . |
| 2621287 | 10/1988 | France . |
| 1161868 | 8/1969 | United Kingdom . |
| 2061710 | 8/1980 | United Kingdom . |
| 2218622 | 5/1989 | United Kingdom . |

Primary Examiner—Robert R. Song
Attorney, Agent, or Firm—Morgan & Finnegan

[57] ABSTRACT

A windshield wiper base unit for a motor vehicle comprises a structure which includes a support means in the form of a support bar carrying at least one bearing through which a windshield wiper drive spindle can pass. The vehicle also has a screen washer fluid bottle connected to screen washing jets associated with the windshield wipers.

At least one liquid receptacle, for example the screen washer fluid bottle, is carried on the support means of the windshield washer base unit.

21 Claims, 3 Drawing Sheets

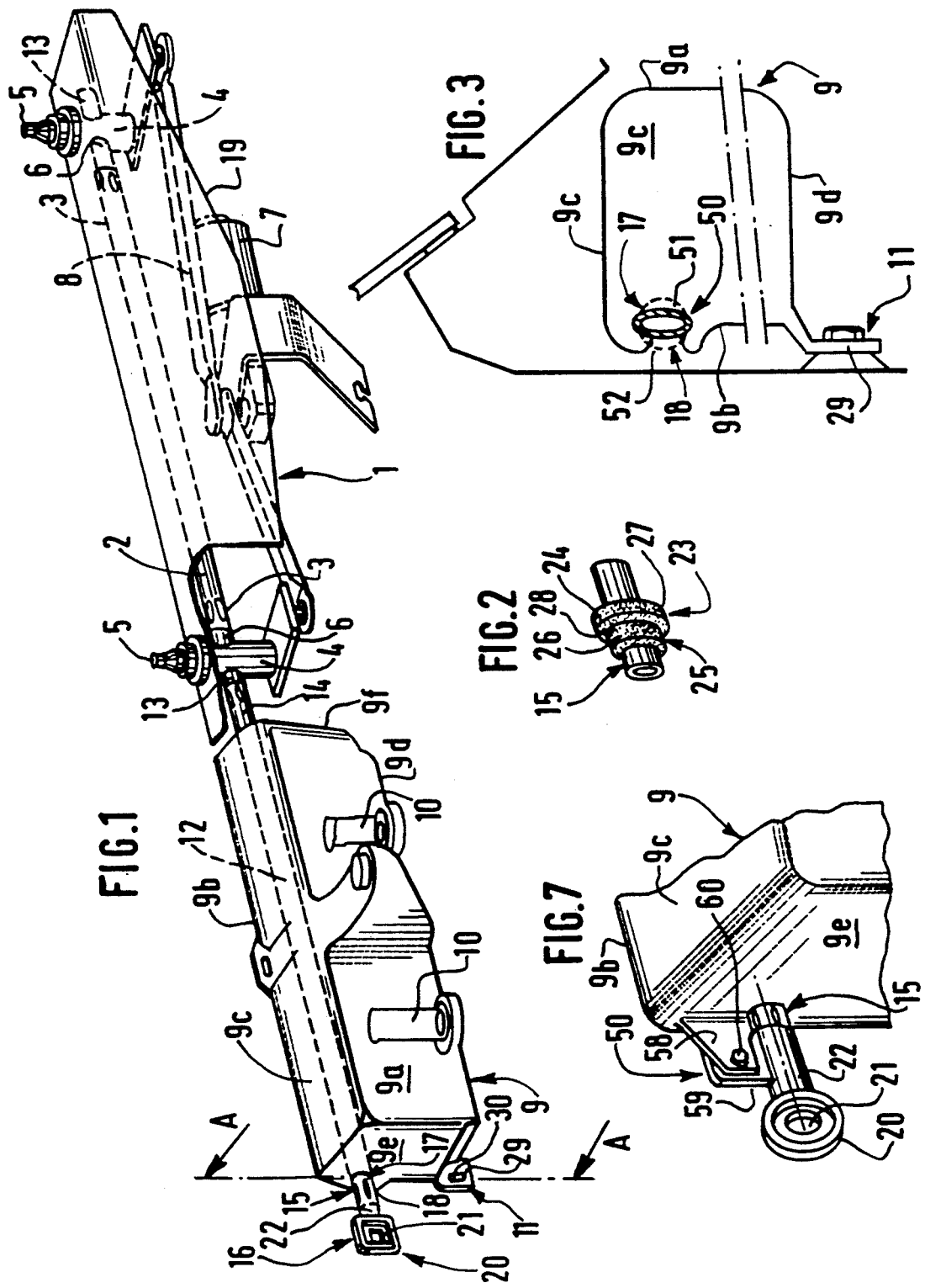

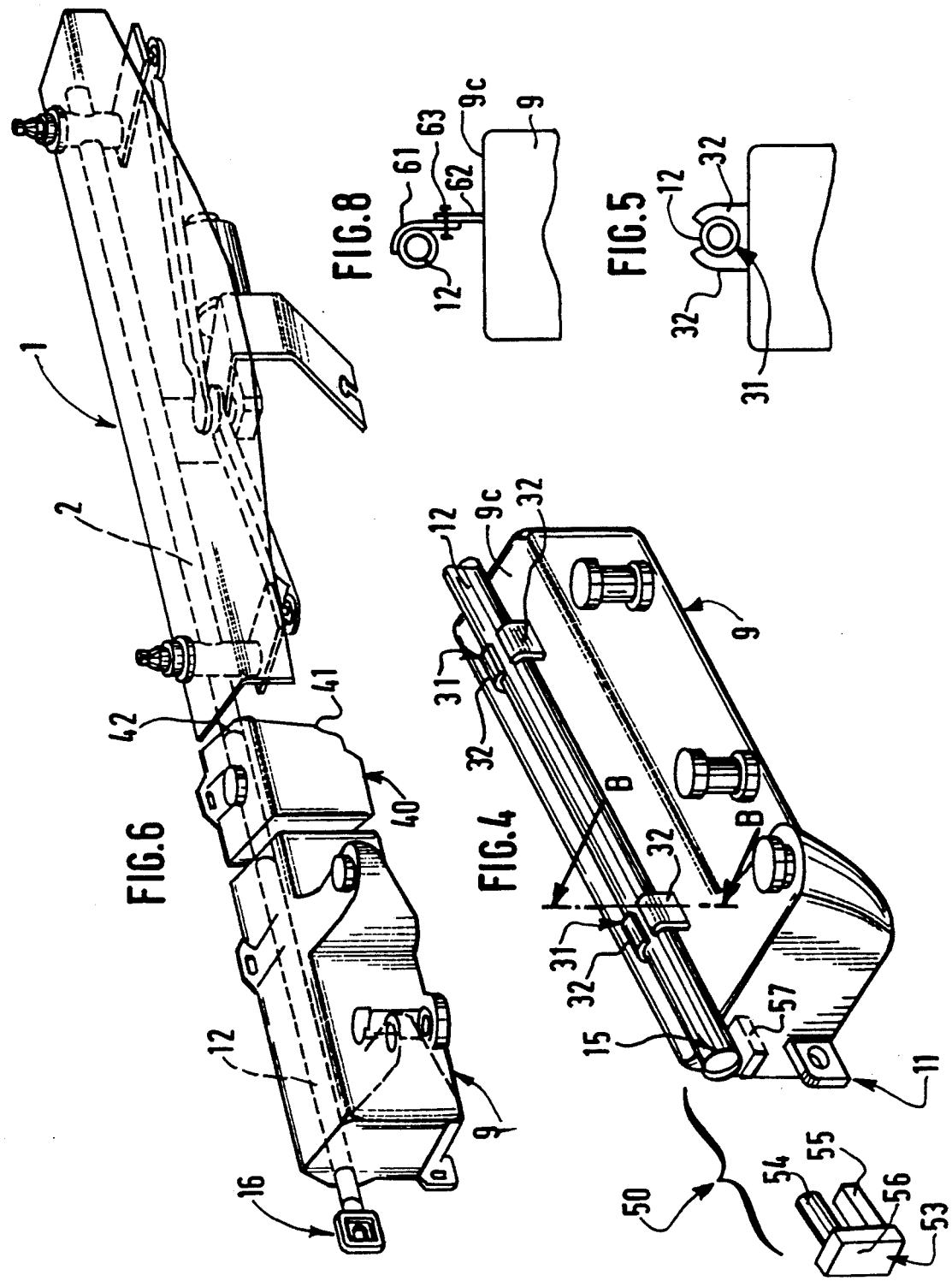

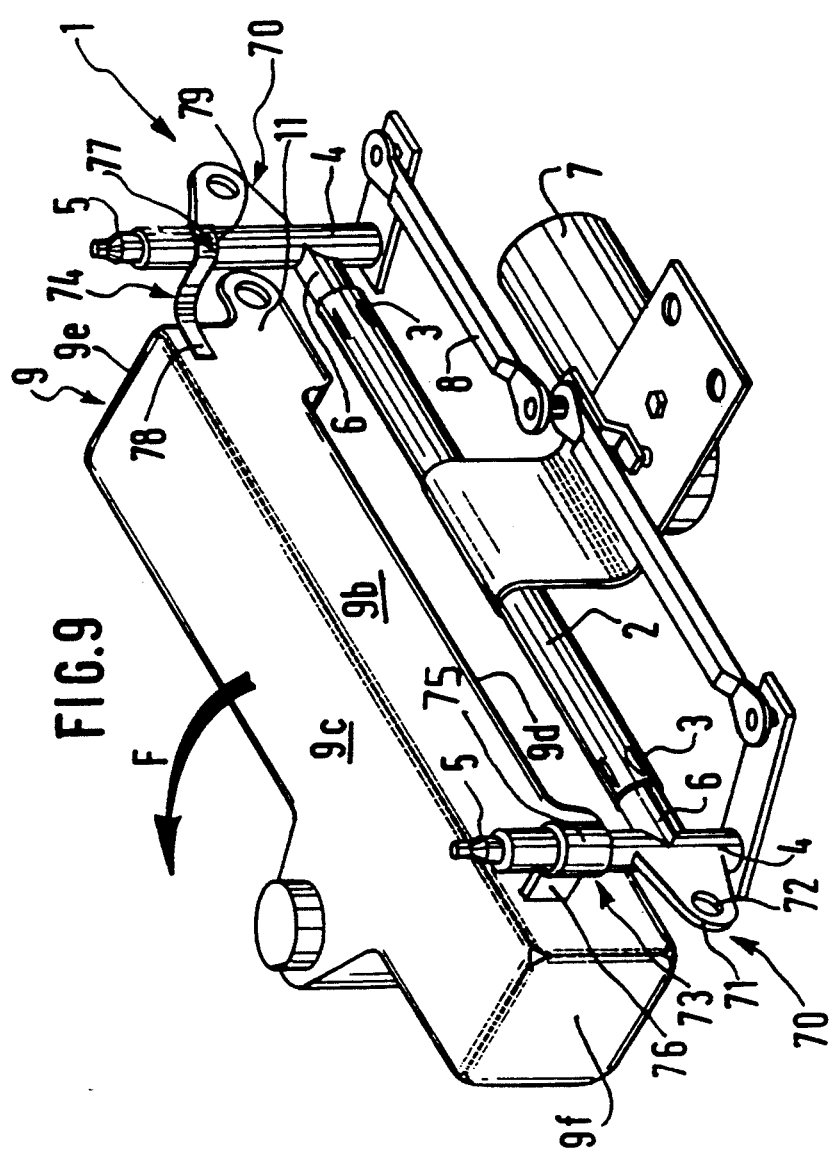
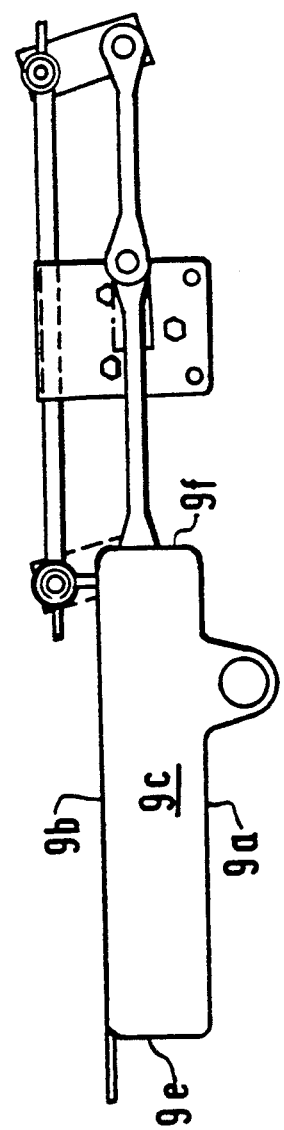

BASE UNIT FOR A WINDSHIELD WIPER ASSEMBLY

FIELD OF THE INVENTION

The present invention relates to a windshield wiper base unit, i.e. a base unit for carrying a windshield wiper assembly, in particular for a motor vehicle, though not being confined to use with motor vehicles.

BACKGROUND OF THE INVENTION

A windshield wiper base unit usually comprises a structure carrying a windshield wiper drive unit in the form of a motorised reduction gear which is arranged to transmit the rotational movement of the rotor, either directly or through a crank type linkage, to the drive spindle of at least one windshield wiper assembly which consists essentially of at least one windshield wiper arm, each carrying a wiper blade.

As is described in the specification of published French patent application No. FR 2 621 287A, such a base unit consists of a structure that includes a support bar of a predetermined length, which includes at each of its ends a respective bearing in which is supported the drive spindle of one of the windshield wiper assemblies, and/or fastening means for securing the unit on to a fixed element of the bodywork of the motor vehicle.

It is normal in a motor vehicle to provide a liquid receptacle, for example a screen washer bottle containing a screen washing liquid. Such a bottle is arranged under the hood of the vehicle, often some distance from the base unit and usually in the engine compartment of the vehicle in a place which is accessible for maintenance and filling purposes. The bottle is connected to the distributing means for the liquid, e.g. jet nozzles which project the liquid on to a glass surface such as the windshield, through an assembly of tubes with means for dividing the flow of the liquid towards the jets. In such an arrangement the jets are arranged close to the windshield wiper drive spindles, and it is necessary to connect the jets to the washer fluid bottle through a multiciplicity of tubes or other guide means. This in turn necessitates complicated fitting operations on the production line, while the apparatus itself is relatively expensive because of the length of the various tubes.

DISCUSSION OF THE INVENTION

An object of the present invention is to overcome the above mentioned disadvantages by proposing a windshield wiper base unit of simple design, in which a liquid receptacle such as a screen washer liquid bottle is mounted in the base unit in such a way as to reduce the number of fitting operations required on the production line as well as the lengths of tubing necessary.

According to the invention, a windshield wiper base unit, in particular for a motor vehicle, comprising a structure that includes support means in the form of at least one bar carrying at least one bearing, is characterised in that at least one liquid receptacle is carried by the said structure. This arrangement provides a single unit which includes not only the supporting and driving means for the windshield wipers, but also at least one liquid receptacle such as the screen washer bottle.

Further features and advantages of the invention will become apparent from a reading of the description, given below, of preferred embodiments of the invention, which are presented by way of example only and with reference to the accompanying drawings.

BRIEF DESCRIPTION OF THE DRAWINGS

FIG. 1 is a perspective view showing the windshield wiper base unit in a first embodiment in accordance with the present invention.

FIG. 2 is a detailed view on a larger scale, showing an element of the windshield wiper base unit in a modification in accordance with the invention.

FIG. 3 is a diagrammatic view in partial cross section taken on a line AA in FIG. 1.

FIG. 4 is a perspective view showing modifications in details of the construction of the windshield wiper base unit of the present invention.

FIG. 5 is a diagrammatic scrap view, in partial cross section taken on the line BB in FIG. 4.

FIG. 6 is a perspective view showing a further modification to the windshield wiper base unit of the invention.

FIG. 7 is a view on a larger scale, showing a detail of an element forming part of the windshield wiper base unit of the invention, in another modification.

FIG. 8 shows yet another modification of a constructional detail of the windshield wiper base unit of the invention.

FIG. 9 is a perspective view showing a second embodiment of the base unit in accordance with the invention.

FIG. 10 is a top plan view on FIG. 9, showing the windshield wiper base unit in its operating position as fitted, to a motor vehicle.

DESCRIPTION OF PREFERRED EMBODIMENTS OF THE INVENTION

With reference first to FIG. 1, the windshield wiper base unit comprises a support structure 1, including support means which in this example includes a support element in the form of a hollow main support bar 2. In this example, the hollow bar 2 is circular in shape and carries at each of its ends 3 a bearing 4 which is arranged to carry a respective one of two drive spindles 5, each of which is fixedly connected to a windshield wiper assembly (not shown). Each windshield wiper assembly consists generally of a windshield wiper arm carrying a wiper blade pivoted to the arm.

Each bearing 4 is tubular in shape with the drive spindle 5 being received within it the tubular bearing having an axis which lies substantially at right angles to the longitudinal direction of the hollow bar 2. Each bearing 4 includes a first laterally projecting element 6 which cooperates with the corresponding end 3 of the hollow bar 2, to which it is connected by any appropriate means, such as riveting, crimping or screw fastening.

Each bearing 4 may if necessary also include securing means for securing it on to the bodywork of the motor vehicle (not shown here). These securing means may comprise either a fastening ear projecting from the bearing and having an aperture through which a fastening screw passes, or a fastening system whereby the bearing is attached to the bodywork by passing through a hole in the latter, being then secured by a nut engaging on an external screw thread formed on the bearing. The structure 1 includes, in a known manner, a windshield wiper drive unit 7 in the form of a reduction gear driven by a motor and arranged to transmit its alternating or continuous rotary motion either directly to the drive spindle 5 or through a motion converting mechanism such as a crank linkage 8.

The support structure 1 of the windshield wiper base unit is adapted to carry a liquid receptacle such as a screen washing fluid bottle 9, which may be carried directly by the hollow bar 2 as will be seen.

In the example shown in FIG. 1, the windshield washer fluid bottle 9 is in the form of a hollow container having a shape which is generally that of a parallelepiped. In this form it has two substantially vertical large faces 9a and 9b, two horizontal large faces 9c and 9d, and two side faces 9e and 9f. One of the large faces, 9a, carries housing elements 10 for receiving an actuating member of the washer fluid circuit, for example a washer fluid pump. The faces 9b and 9d carry securing means 11 for fastening the bottle on to the bodywork. The bottle is arranged to be carried by an extension bar 12 which is supported by the structure 1 described above, and which is part of the support means that also includes the bar 2. The extension bar 12, the main support bar 2, the structure 1, and the bottle 9, together constitute the windshield wiper base unit in this example.

More precisely, at least one of the bearings 4 has a projecting element 13 lying in diametrically opposed relationship to the projecting element 6 of the same bearing, the two elements 6 and 13 being of substantially the same size and shape. In the particular example shown in FIG. 1, each bearing 4 has a projecting element 13 opposite to the element 6 as will be explained in greater detail below. Thus, one end 14 of the extension bar 12 is carried by the projecting element 13, and in this example the extension bar 12 is in the form of a circular tube having a predetermined length. The end 14 of the extension bar 12 associated with the projecting element 13 engages around the latter so as to be secured fixedly and rigidly to the latter by any suitable means such as riveting, crimping or threaded fastening. The other end 15 of the extension bar 12 has a connecting or fastening means 16 for connecting or fastening it to the bodywork of the vehicle.

The windshield washer fluid bottle 9 is carried on the extension bar 12, for example by mating cooperation in which it is clipped on to the latter. The bottle 9 has a longitudinal groove 17 formed in one of its faces facing towards the extension bar 12. In this example it is the face 9b, and the groove 17 has an open side 18 facing the bar 12, the groove being open at both ends 9e, 9f of the bottle 9. These arrangements are best seen in FIG. 3. Preferably, the longitudinal groove 17 has a cross sectional shape which is complementary to that of the transverse cross section of the extension bar 12, so as to afford mating engagement.

Thus, the windshield wiper base unit represents a complete module in which the carrying structure for the windshield wiper drive mechanism, the support for the windshield washer fluid bottle, and the washer bottle itself, are all included.

This windshield wiper base unit may be applied both to vehicles having right hand drive and those having left hand drive. To this end, it is only necessary to change the position of the extension bar 12 carrying the washer fluid bottle, in relation to the structure 1, in order t obtain a desired position of this sub-assembly according to whether the vehicle has left hand drive or right hand drive. Thus, in order to adapt the unit according to the type of drive of the vehicle, it is simply necessary to connect the corresponding end of the extension bar 12 either to the left hand bearing 4 as shown in FIG. 1, or to the other bearing 4 which is indicated at the right of FIG. 1, and to fit the corresponding securing means 16.

For aesthetic reasons, and without detriment to the operation of the assembly, the support structure 1 may of course be overlaid by a shield 19 which overlies the bearings 4, the hollow bar 2, the drive unit 7, and any motion converting mechanism 8.

The connecting and/or fastening means 16 between the extension bar 12 and the bodywork may be in the form of an ear element 20 formed with a hole 21, through which any suitable fastener such as a screw can be passed. The ear element 20 is joined to the end 15 of the extension bar 12 by the partial introduction of a projection 22, formed on the ear element, into the hollow end 15 of the bar 12, to which this extension 22 is then secured by any suitable means such as crimping, riveting or threaded fastening.

Referring now to FIG. 2, the connecting and/or fastening means 16 here include a vibration damping member 23, which comprises, at the interface with the bodywork of the vehicle, a resilient element 24 for absorbing any vibrations. The resilient element 24 is in the form of a sleeve 25 surrounding the end 15 of the extension bar 12. This sleeve has a first sleeve portion 26, which bears on the outer periphery of the extension bar 12 and which is continued in a second sleeve portion 27, the latter being of larger diameter than the first sleeve portion so as to define a shoulder 28 facing towards the free end of the extension bar 12.

Thus, for securing the base unit, the latter is fastened in the first case by means of the ears provided on the bearings 4 and on the extension bar 12, and by the fastening means 11 which are provided on the washer fluid bottle 9. In the examples shown in FIGS. 1 and 3, these latter comprise a projecting lug 29 which is formed with a hole 30 through which any suitable fastening means is passed, for example a screw as in FIG. 3. In the alternative or second case, this fastening is achieved by introducing the end 15 of the extension bar 12 carrying the sleeve 25 into a corresponding opening formed in the bodywork, in such a way that the first sleeve portion 26 comes into peripheral contact with the circular edge of the hole while the shoulder 28 between the first and second sleeve portions bears against the surface of the bodywork that surrounds the hole in the latter, after which the base unit assembly is fastened to the bodywork by means of the ears provided on the bearings 4, together with fastening means 11 for the bottle 9.

A longitudinal groove 17, formed on one of the faces of the washer bottle, has been mentioned above. In the case shown in FIG. 1, this groove is located on the rear face 9b of the bottle 9, considered in the direction of viewing in FIG. 1. However, this groove may be located on the upper face 9c of the bottle, being again clipped around the extension bar 12. In addition, and as shown in FIGS. 4 and 5, the clipping attachment of the bottle 9 may be obtained using at least one resilient, projecting clip 31. As shown, there are two such clips, arranged on any one of the faces of the bottle but shown in the drawings as being on the face 9c.

The resilient clips 31 are, in this example, formed integrally with the remainder of the bottle, and comprise two resilient branches 32 which embrace the greater part of the outer periphery of the extension bar 12. In the example shown in FIGS. 4 and 5, the clips 31 project directly from the upper face of the bottle, with their branches 32 lying substantially at right angles to the face 9c, being orientated in such a direction that the branches 32 become closed on the outer surface of the bar 12, as is best seen in FIG. 5. This arrangement results in the internal space between the two branches corresponding substantially to the cross section of the bar 12.

Referring now to FIG. 6, this shows a second liquid receptacle 40 carried on the extension bar 12. This receptacle 40 may for example be a reservoir arranged to contain a brake fluid used in the braking circuit of the vehicle. As shown in FIG. 6, the second receptacle 40 again comprises a hollow container, 41, which is carried by the extension bar 12 in the same way as the bottle 9. The container 41 is formed with a longitudinal groove 42 for this purpose, and lies beside the washer fluid bottle 9.

The reservoir 40 may of course be formed with fastening means for securing it to the bodywork of the vehicle and/or to the bottle 9, and the reservoir 40 may be formed integrally with the bottle 9. In addition, the bottle 9 may be carried by the extension bar 12, with the reservoir 40 being carried by the support bar 2 of the structure 1, or vice versa. Again, the bottle 9 and reservoir 40 may both be carried by the support bar 2, being for example clipped to the latter.

Referring now to FIGS. 3, 4 and 7, the receptacle 9 and/or 40 includes stop means 50 for preventing rotation of the receptacle or both receptacles with respect to the bar 2 or 12 on which they are carried. In the interests of simplification of this description, only the washer fluid bottle 9 will be considered, clipped on to a bar 12 or 2. However it is to be understood that this description is also applicable to the liquid reservoir 40 clipped on to either of the two bars 2 or 12.

With reference first to FIG. 3, this shows the cross section of the bar carrying the bottle (here the extension bar 12) as being a non-circular cross section as indicated at 51, for example oval or oblong and extending over a length which is at least equal to the length of the bottle. Also shown is the groove 17 formed in the bottle. Where engaged with the bar 12, the groove 17 has, as shown, a non-circular cross section complementary to that of the bar 12 and substantially identical with the cross section of the bar 12. In the absence of the bar 12, the groove 17 has a circular cross section as indicated at 52 in broken lines in FIG. 3. The perimeter of this groove is substantially equal to the perimeter of the non-circular cross section of the bar 12, and the material of the bottle is such that the latter has a certain degree of elasticity such that, during the clipping operation, the groove 17 becomes deformed in cross section so as to embrace the shape of the cross section 51 of the bar 12, so preventing the bottle from rotating on the bar.

In the modified arrangement shown in FIG. 4, the stop means 50 comprise a horseshoe element 53 cooperating with the bar 12 and bottle 9. The horseshoe element 53 has two arms 54 and 55 lying substantially parallel to each other and carried by a yoke portion 56 at right angles to these arms. The arm 54, which has a cross section substantially identical to that of the internal cross section of the bar 12, is adapted to be introduced into the hollow part of the end 15 of the extension bar 12, which thus has no fastening means 16. The arm 55 is adapted to be introduced into a hollow housing 57 on the face of the bottle 9, on the same side of the latter as the end 15 of the extension bar 12 corresponding with the said arm. The arm 54 and/or the arm 55 is preferably force-fitted into the corresponding hollow portions in such a way as to prevent their subsequent movement. As is best seen in FIG. 4, the arm 55 has a non-circular cross section, for example a rectangular cross section, while the housing 57 has a cross sectional shape which is substantially identical to that of the arm 55, so as to ensure that the horseshoe element 53 will not rotate with respect to the bottle 9.

In the embodiment shown in FIG. 7, the stop means 50 comprise a projecting first lug 58, extending from the face of the bottle lying on the same side as the end 15 of the extension bar 12. The lug 58 engages on a projecting second lug 59 which is at right angles to, and projects from, the extension 22. Preferably, the two lugs 58 and 59 are attached to each other (by any suitable means, for example a screw 60) in such a way that they prevent the bottle from rotating with respect to the bar.

In the embodiment shown in FIG. 8, the windshield washer fluid bottle 9 is carried by the extension bar 12 by means of at least one lug 61. In this example, although only one is shown, there are two of these lugs 61, disposed in positions defined in the longitudinal direction of the bar 12. This not only ensures that the bottle 9 is retained on the bar 12, but also constitutes the stop means for preventing the bottle 9 from rotating on the bar 12. For this purpose, the lug 61 projects radially with respect to the bar 12, and the bottle 9 has another lug 62 which projects from its face 9c and which in this example is integral with the bottle. The lugs 61 and 62 have holes in register with each other so that any suitable fastening means, such as a screw 63, can be passed through them to secure the bottle 9 fixedly and rigidly to the bar 12.

It may of course be arranged that the bar 12 carries only one single lug 61, with the bottle having two lugs, one of which cooperates with the lug 63 and the other cooperating with the lug 59 already described with reference to FIG. 7.

In the embodiment of the invention shown in FIGS. 9 and 10, the windshield wiper base unit comprises a support structure 1 which is substantially identical to that described with reference to the foregoing Figures, and includes the same elements, namely a hollow support bar 2 carrying the bearings 4, the drive spindles 5, the windshield wiper drive unit 7 and the motion converting mechanism 8. However, in this embodiment, fastening means 70 are shown for fastening it on to the bodywork of the vehicle, these fastening means comprising ears 71 which project away from the projecting elements 6 carried by the bearings 4. Each of these ears 71 is formed with a hole 72 for receiving any suitable fastener such as a screw.

In this embodiment, the bottle 9 is again carried by the support structure, but here it is carried so as to be rotatable on the support structure. More precisely, the bottle 9 is rotatably carried by one of the bearings 4 of the support structure. To this end, the bottle 9 has, on its face 9b, that is to say its rear face, a rotation means 73 for enabling the bottle to rotate about that bearing, together with stop means 74 for arresting the rotary displacement of the bottle in a storage or transport position (i.e. the position seen in FIG. 9), in which the bottle lies along, and parallel to, the support structure. The rotation means 73 comprises a tubular wall 75 which is joined through a rib 76 to the rear face 9b of the bottle so as to be spaced away from the latter. The tubular wall, or bush, 75 has a vertical axis parallel to the rear face 9b and lies close to the junction between the side face 9f and the rear face 9b of the bottle 9. The bush 75 and the rib 76 are preferably formed integrally with the bottle 9. The bush 75 is arranged to surround the outer periphery of the bearing 4, so that the bottle 9 is able to pivot freely and coaxially about the bearing 4.

The stop means 74 is associated with the other bearing 4, at the opposite end of the rear face 9b of the bottle from the bush 75, i.e. close to the junction between the rear face 9b and the side face 9e. The stop means 74 comprises a resiliently deformable finger 77 having an anchor end 78 carried by the rear face 9b of the bottle, and a free end 79 which bears on the periphery of the associated bearing 4. The finger 77 may be arranged to cooperate with the hollow support bar 2 of the structure 1 instead of with the bearing 4. As can readily be seen from FIG. 9, the bottle 9 is releasably prevented from rotating about the left hand bearing 4 seen in that Figure, by virtue of the cooperation between the resilient finger 77 and the right hand bearing 4. The assembly is thus able to be easily manipulated and has a reduced length, which enables its overall longitudinal dimension to be reduced for transport purposes.

In a modification, a further receptacle, such as the brake fluid reservoir 40 described above in relation to FIG. 6, may be mounted on the right hand bearing 4 in FIG. 9. In another modification, the rotation means 73 may be defined by a hollow profiled element formed on the bottom face 9d of the bottle and projecting within the envelope of the bottle.

In preparing the base unit for fitting to the vehicle, and as can be seen in FIG. 9, a force is simply exerted on the bottle 9 such as to cause it to pivot about the left hand bearing 4 as indicated by the arrow F, thus causing the finger 77 to be flexibly released from its engagement with the right hand bearing 4. The finger 77 then straightens up as indicated in FIG. 10, which shows the bottle 9 extending beyond the structure 1 in the position in which the windshield wiper base unit is then secured to the bodywork of the vehicle.

The extension bar 12 of FIG. 1 can of course be pivotally mounted around one bearing 4 by means of a suitable rotation means arranged at one of its ends, with a stop means at its other end. This rotation means can again be in the form of a bush, and the extension bar 12 will then carry the liquid receptacles 9 and 40.

It will of course be further understood that the present invention is not limited to the embodiments described above, but embraces all other embodiments and modifications within the scope of the Claims appended hereto.

What is claimed is:

1. A windshield wiper base unit for a motor vehicle comprising a support structure which includes support means in the form of at least one bearing for a spindle, said bearing being carried by at least one bar and at least one liquid receptacle carried by said support structure and means for mounting said unit to a body portion of a vehicle.

2. A base unit according to claim 1, wherein the said support means comprises a main support bar, with at least one said liquid receptacle being carried by the main support bar.

3. A base unit according to claim 1, wherein the said support means further includes an extension bar, with at least one said liquid receptacle being carried by the extension bar.

4. A base unit according to claim 3, wherein the extension bar is joined to a said bearing.

5. A base unit according to claim 1, wherein the or a said liquid receptacle is carried by a said bearing.

6. A base unit according to claim 1, further including cooperating first and second clipping means formed on at least one said liquid receptacle and on the support means respectively, whereby at least one said liquid receptacle can be mounted on the structure by being removably clipped on the support means.

7. A base unit according to claim 6, wherein the said first clipping means comprises a groove formed in at least one said liquid receptacle.

8. A base unit according to claim 6, wherein the said first clipping means comprises projecting clip means carried by at least one said liquid receptacle.

9. A base unit according to claim 1, further including first stop means carried by a said liquid receptacle for preventing rotation of the latter with respect to the support means.

10. A base unit according to claim 9, wherein the said first stop means comprise a first lug carried by the support means and a second lug carried by a said liquid receptacle for cooperation with the said first lug.

11. A base unit according to claim 7, wherein the said groove has a non-circular cross section and the said second clipping means of the support means has a corresponding non-circular cross section, whereby to define first stop means for preventing rotation of the liquid receptacle with respect to the said support means.

12. A base unit according to claim 9, wherein the said first stop means comprise a horseshoe element cooperating with the said support means and the liquid receptacle.

13. A base unit according to claim 1, wherein the said structure includes at least one support lug projecting from the structure and carrying the liquid receptacle.

14. A base unit according to claim 1, wherein the said support means includes an extension bar and fastening means carried by the extension bar for securing it to the bodywork of a motor vehicle.

15. A base unit according to claim 14, wherein the said fastening means is a fixed and rigid fastening means.

16. A base unit according to claim 14, wherein the said fastening means is flexible.

17. A base unit according to claim 1, further including mounting means mounting at least one said liquid receptacle rotatably about a said bearing.

18. A base unit according to claim 17, wherein at least one said liquid receptacle further includes second stop means for limiting its rotational movement about the said bearing.

19. A base unit according to claim 1, wherein a said liquid receptacle is a screen washer bottle.

20. A base unit according to claim 1, wherein a said liquid receptacle is a brake fluid bottle.

21. A windshield wiper base unit for a motor vehicle comprising a support structure which includes support means in the form of at least one bearing for a spindle, said bearing being carried by at least one bar and at least one liquid receptacle carried in said unit and means for mounting said unit to a body portion of a vehicle.

* * * * *